Figure 1:
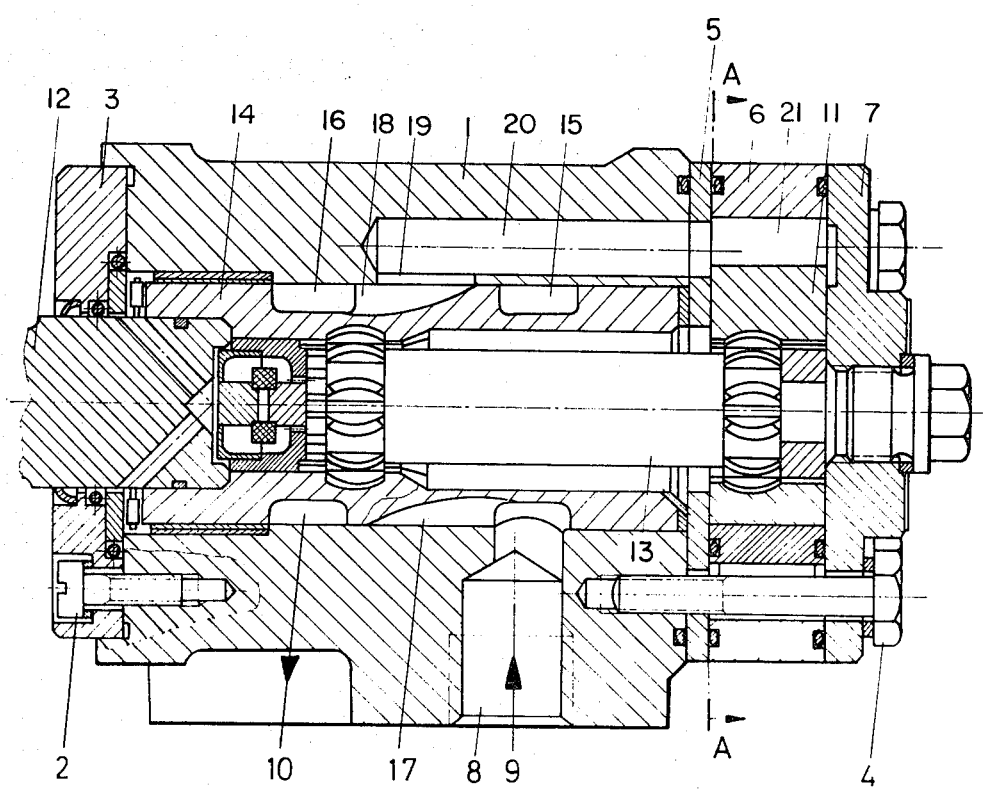

United States Patent
Petersen

[15] 3,690,792
[45] Sept. 12, 1972

[54] TOOTHED WHEEL MACHINE
[72] Inventor: Alex Petersen, Sonderborg, Denmark
[73] Assignee: Danfoss A/S Nordborg, Denmark
[22] Filed: Dec. 10, 1970
[21] Appl. No.: 96,721

[30] Foreign Application Priority Data
Dec. 15, 1969 Germany..........P 19 62 769.1

[52] U.S. Cl....................................418/61, 418/129
[51] Int. Cl..........F01c 1/02, F04c 1/02, F04c 17/02
[58] Field of Search.........418/61, 129, 160, 171, 122

[56] References Cited

UNITED STATES PATENTS

| | | |
|---|---|---|
| 3,343,526 | 9/1967 | Peras.......................418/61 X |
| 3,193,186 | 7/1965 | Peras..........................418/61 |
| 3,226,013 | 12/1965 | Toyoda et al................418/61 |
| 2,189,976 | 2/1940 | De Lavaud............418/171 X |

FOREIGN PATENTS OR APPLICATIONS

| | | |
|---|---|---|
| 402,503 | 1/1968 | Australia.....................418/61 |

Primary Examiner—Carlton R. Croyle
Assistant Examiner—Richard E. Gluck
Attorney—Wayne B. Easton

[57] ABSTRACT

The invention relates to a gear set of the type comprising a generally annularly shaped internally toothed ring member and an externally toothed star member having at least one fewer teeth than the ring member. The star member has an axis disposed eccentrically relative to the axis of the ring member. These parts are normally formed with low tolerances to facilitate fluid tight sealing between the meshing teeth. A different mode of sealing is provided which comprises sealing plates slidably disposed in radially extending slots formed in the ring member teeth.

2 Claims, 4 Drawing Figures

TOOTHED WHEEL MACHINE

The invention relates to a toothed wheel machine comprising two toothed elements, namely an externally toothed wheel and a toothed ring surrounding, and having one tooth more than, the wheel, the chambers formed between the teeth alternately communicating with the high pressure connection and the low pressure connection, and there being provided in all the teeth of one of the toothed elements radially movable sealing leaves which bear only temporarily against the other toothed element.

Greater fluid tightness can be imparted to the toothed wheel machine with the help of sealing leaves of this kind. In the case of hand pumps for hydrostatic steering systems in particular, greater efficiency is obtained in this way. Furthermore, greater dimensional tolerances can be accepted in the manufacture of the toothed wheel and the toothed ring.

A toothed wheel machine is known in which the toothed wheel carries sealing leaves in the middle of each tooth, these leaves being enabled to move radially over a limited distance under the action of a spring. The dimensions are such that generally only one leaf and at most two neighboring leaves are effective and, over the range in which the volumes of the chambers are at a maximum, the leaf or leaves separate the high pressure space from the low pressure space. This results in less wear of the leaves and reduction of the frictional force as compared with an arrangement in which the leaves bear constantly on the opposite part. It has been found however that considerable losses due to leakage nevertheless occur with this construction.

Also known is a toothed wheel machine in which the toothed wheel has considerably fewer teeth than the toothed ring and in which a crescent shaped insert is fitted in the remaining space. In this machine resiliently mounted sealing elements are fitted in the flanks of the teeth of the toothed ring, and these elements seal off, on both sides, a chamber between the teeth at a point which is fixed with respect to the insert. The toothed wheel machine is intended to handle expansible media such as steam; the sealed chamber is located on the expansion side of the machine. This construction also suffers from considerable losses due to leakage since a complete seal between the toothed elements and the insert cannot be obtained.

The object of the invention is to provide a toothed wheel machine of the initially described kind which suffers from considerably reduced losses due to leakage and in which however wear on the leaves and friction are not appreciably increased.

According to the invention, this object is achieved by the leaves being disposed in the toothed ring in such manner that they cooperate twice with the toothed wheel in each cycle, that each chamber is sealed on both sides by a pair of adjacent leaves, both in the position of maximum volume of the chamber and in its position of minimum volume, and that one or at most two leaves bear on the toothed wheel on the opposite side.

In this arrangement, the leaves separate the two sides in which different pressures occur, not only over the range in which the volume of the chamber is at its greatest, but also in the range in which said volume is at its smallest. As is well known, in the case of the toothed wheel machines here considered, the crests of two teeth cooperate in the range in which the volume of the chamber is at its greatest, while the flanks of two teeth cooperate in the range in which the volume of the chamber is at its smallest. Whereas it has been previously assumed that a restricting gap occurs at the flanks of the teeth that is sufficient to effect a satisfactory seal, it has now been found that considerable losses due to leakage nevertheless occur at this point. These losses due to leakage are suppressed if sealing by means of leaves also takes place in this range. Although, in this arrangement, more leaves move into engagement with the toothed wheel, no greater friction or wear can be expected to occur since in this range a leaf in the crest of each tooth of the ring cooperates with the base of each tooth of the wheel, and in effect only a rolling movement occurs, but no sliding movement.

The leaves preferably extend radially through the middles of the teeth of the ring. Thus, minimum wear on the leaves may be expected. Furthermore, the direction or rotation of the machine can be reversed as required.

In the case where the smallest number of leaves are effective at a particular time, the maximum sealing effect is achieved if the toothed ring has an odd number of teeth, and one effective leaf is positioned opposite the effective pair of adjacent leaves.

There are toothed wheel machines in which the various chambers are not interconnected by means of a groove, but in which ducts which alternately communicate with the high pressure connection and the low pressure connection terminate in the chambers. As an example of this reference may be made to a toothed wheel machine in accordance with German Pat. Specification No. 1 198 750, in which a switching valve always switches the ducts from the higher to the lower pressure or vice versa when the chambers assume their positions of maximum or minimum volume.

In a toothed wheel machine of this kind, it is of very great advantage if the ducts between adjacent leaves on the toothed ring terminate in the chambers. The leaves and the mouths of the ducts thus are correlated in a definite manner. The duct is switched over at a moment at which the chamber is sealed on both sides by leaves. On the other hand, there is no danger of a leaf sweeping across the mouth of the duct, and of the sealing action of the leaf being hazarded because the mouth of the duct acts as a by-pass.

In a further embodiment, each of the leaves can be guided in a slot in known manner, biased by a spring and provided with a stop for limiting radial movement, and the spring can be connected to the leaf in a positive manner and thus act as a stop. In this arrangement, the spring performs two functions; it presses the leaf inwards, but at the same time prevents excess movement in the inward direction. Consequently, it is not necessary to form a stop on the leaf itself. It can simply take the form of a plate.

Each of the springs can be simply made from two pieces of wire which are fitted in lateral recesses in the toothed ring which are closed by cover plates.

It is also expedient if each spring is bent to correspond to the contour of the outer surface of the tooth and if a hole is provided in the bend for the insertion of a clamp bolt. This results in a sufficiently large amount of space for providing the spring mounted leaf arrangement without it being necessary to increase the size of the toothed ring.

Figure 2:
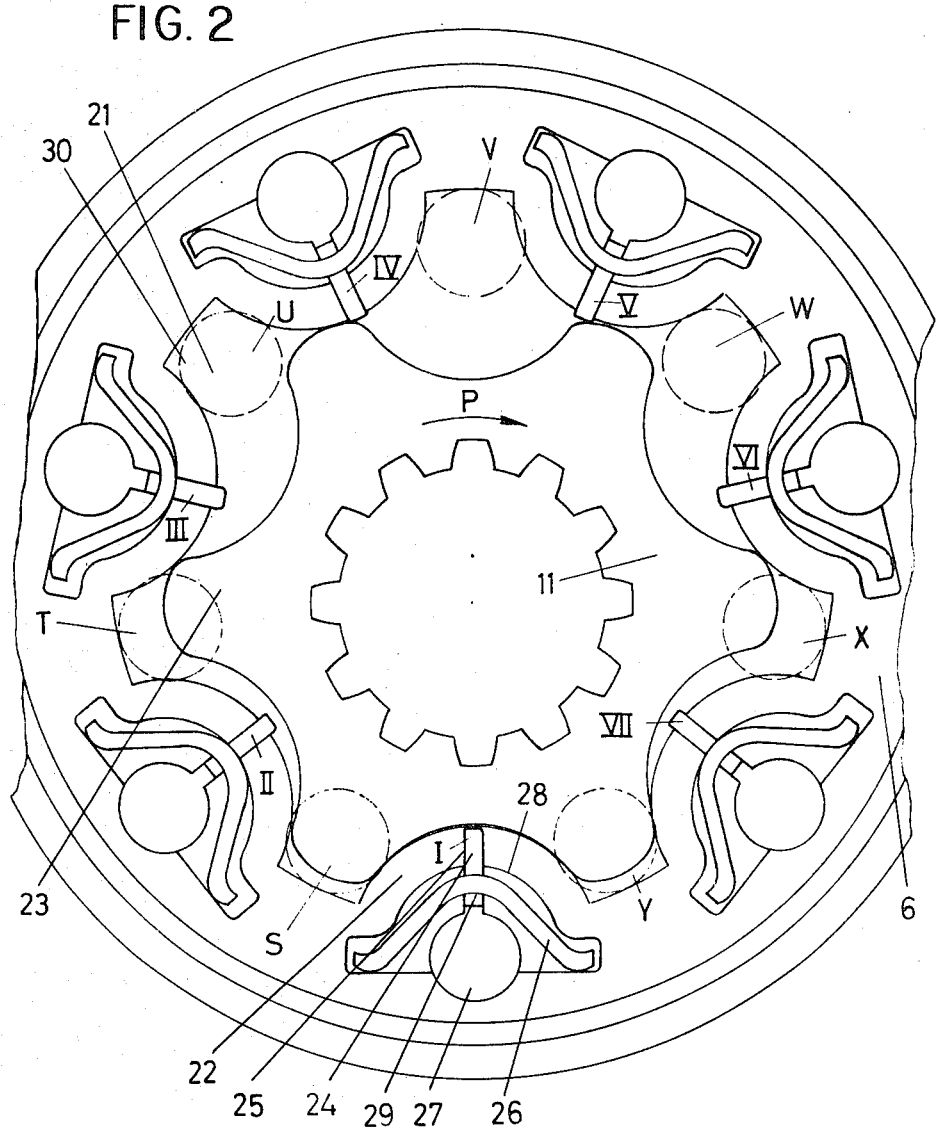
Figure 3:
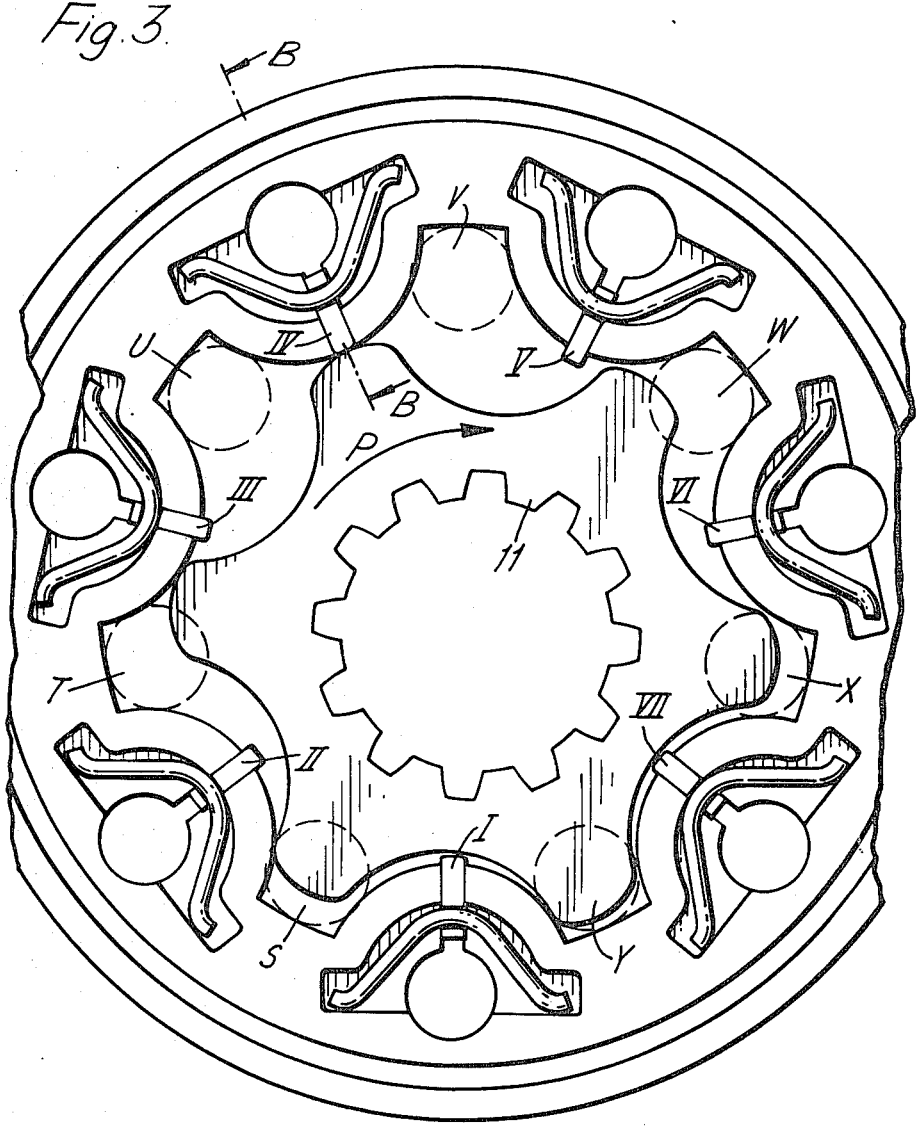
Figure 4:
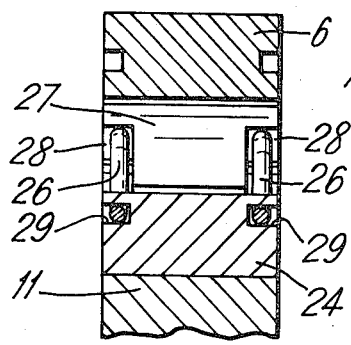

The invention will now be described in more detail by reference to an embodiment illustrated in the drawing, in which:

FIG. 1 shows a longitudinal section through a toothed wheel machine in accordance with the invention, FIG. 2 shows, on the greater scale, a section on the line A—A, the clamping screws and the universal joint shaft being omitted however, FIG. 3 depicts the arrangement shown in FIG. 2 after one revolution of the toothed wheel, and FIG. 4 is a section through a detail on the line B—B of FIG. 3.

A casing 1 carries on one of its sides a cover plate 3 secured by screw bolts 2, and on its other side an intermediate disc 5, a toothed ring 6 and a cover plate 7, all likewise secured by screw bolts. The casing 1 also contains a port 8 and a second port which is not illustrated. If it is assumed that the machine is working as a pump, then oil is drawn in in the direction indicated by the arrow 9 and is discharged under pressure in the direction indicated by the arrow 10. The toothed ring 6 cooperates with a toothed wheel 11 which rotates slowly while at the same time the center point of the toothed wheel executes a circular movement at a great speed. To enable the rotary movement of the toothed wheel 11 to be transmitted to a main shaft 12, a universal joint shaft 13 which balances the circular movement of the center point, is connected to the toothed wheel, the other end of this universal joint shaft extending into a rotary slide 14. The latter is firmly connected to the main shaft 12. The rotary slide has two circumferential grooves 15 and 16. The groove 15 communicates constantly with the low pressure inlet port 8, and the groove 16 with the high pressure outlet port. Disposed on the periphery of the rotary slide 14 in alternating manner are axial grooves 17, which communicate with the peripheral groove 15, and axial grooves 18 which communicate with the peripheral groove 16. The number of grooves 17 and 18 corresponds to the number of teeth on the wheel 11. The casing contains openings 19, each of which is associated with a duct 20. The ducts 20 terminate at chambers 21 formed between the teeth of the wheel and the ring. The number of openings 19 is equal to the number of teeth on the ring 6. Consequently, the chambers 21 are alternately connected to the low pressure and high pressure port in such manner that the pump continuously delivers oil under pressure. On the other hand, when oil under pressure is passed to the port 8, the machine operates as a motor.

The ring 6 has seven teeth 22, and the ring 11 has six teeth 23. A plate like leaf 24 is displaceably fitted in slot 25 in the middle of each tooth 22 on the ring. The leaf is urged radially inwards by two arcuate wire springs 26. The wire springs are matched to the outer surface of the tooth 22 and are so disposed as to provide space for an opening 27 for the insertion of the clamping bolt 4. The wire springs are accommodated in recesses 28, in the side-face of the toothed ring 6 and are prevented from falling out by means of cover plates, i.e. the intermediate disc 5 and the cover plate 7. As can be seen from FIG. 4, the leaf 24 has an incision 29 at each of its sides, the spring wire 26 extending into these incisions. In this way, the leaf is urged radially inwards by the springs. The movement is however limited by the fact that the springs abut the edge of each of the recesses 28. The mouths 30 of the ducts 20 are located at the base between adjacent teeth 22 on the ring, i.e. also between adjacent leaves 24.

For the purpose of the following explanation, the leaves, considered in the clockwise direction, are designated by the numerals I — VII, whereas the chambers formed between the teeth are designated by the letters S — Y.

In the position shown in FIG. 2, the chamber V is in the position at which its volume is at its maximum, and it is sealed on both sides by the leaves IV and V. Opposite this chamber, the leaf I bears against the toothed wheel 11. If the toothed wheel 11 rotates in the direction of the arrow P, the chambers W, X and Y are under higher pressure, and the chambers S, T and U are under lower pressure, whereas the chamber V is switching from the lower to the higher pressure. In FIG. 3, the toothed wheel 11 has rotated a little farther. This time the chamber Y is in a position in which its volume is at a minimum. It is sealed on both sides by the leaves I and VII. The leaf IV is positioned opposite this chamber Y. Higher pressure obtains in the chambers V, W and X, and lower pressure in the chambers S, T and U. The chamber Y is switching from the higher to the lower pressure. It can be seen that the leaves bear against the toothed wheel 11, only in the change over range, and that in the range covered by the smallest chambers, the leaves, i.e. leaf I in FIG. 2 and leaves I and VII in FIG. 3, are hardly subjected to any friction at all. Each of the chambers is sealed by leaves while it is switching over, so that the change over can proceed in a trouble free manner. Relatively generous manufacturing tolerances are permissible, since on both sides, the leaves provide a seal between the high pressure and low pressure chambers.

I claim

1. A gear set comprising, a generally annularly shaped internally toothed ring member having teeth with convex surface portions, an externally toothed star member having at least one fewer teeth than said ring member and having an axis disposed eccentrically relative to the axis of said ring member, said ring member teeth having slots extending radially relative to the axis thereof and normal to said surface portions, sealing plates slidably disposed in said slots, resilient means connected to said plates for biasing said plates in a radially inward direction toward the axis of said ring member and for limiting the radially inward movement of said plates, said resilient means being spring wires each having a generally half-circle shape, said plates each having at least one notch through which one of said wires extends.

2. A gear set according to claim 1 in which said spring wires are respectively parallel to said convex surface portions of said teeth, and bolt holes for said ring member which are respectively in generally coaxial relation to said teeth surface portions.

* * * * *